March 8, 1949.　　　　J. W. EDWARDS　　　　2,463,755
POLISH ROD CLAMP
Filed Sept. 16, 1946　　　　2 Sheets-Sheet 1
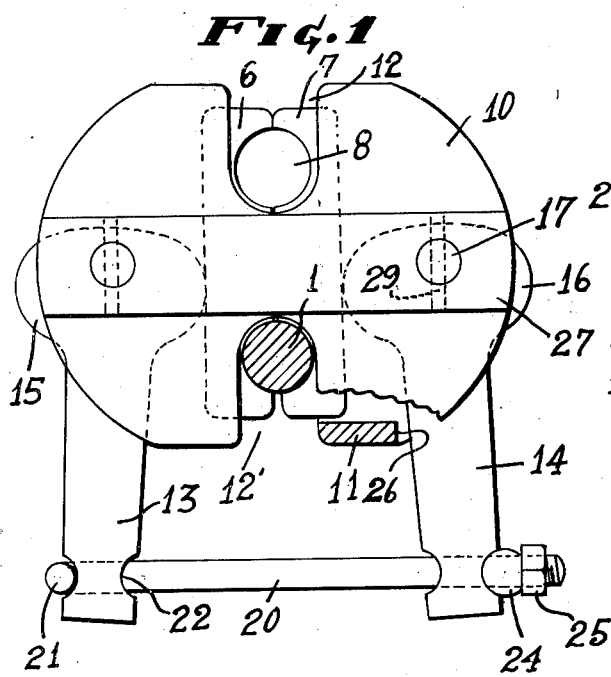
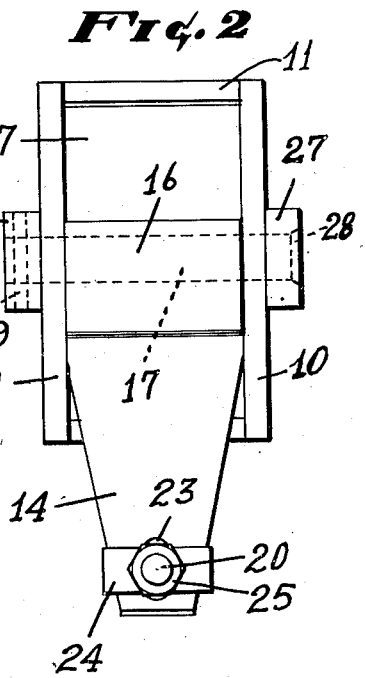
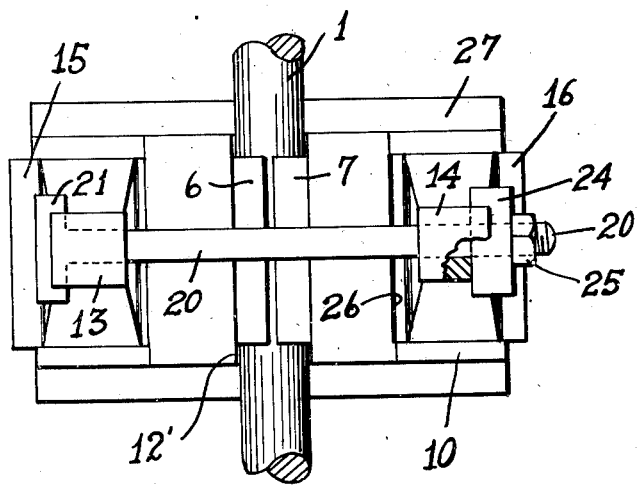
INVENTOR.
JOHN W. EDWARDS.

March 8, 1949.     J. W. EDWARDS     2,463,755
POLISH ROD CLAMP
Filed Sept. 16, 1946     2 Sheets-Sheet 2
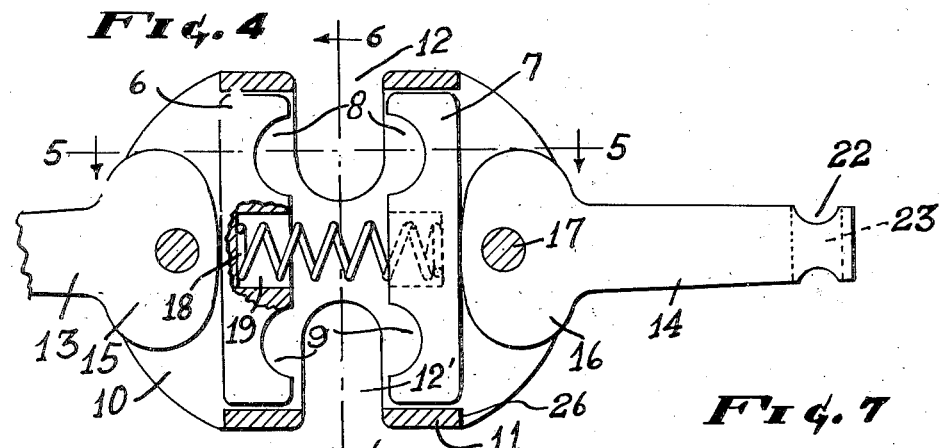
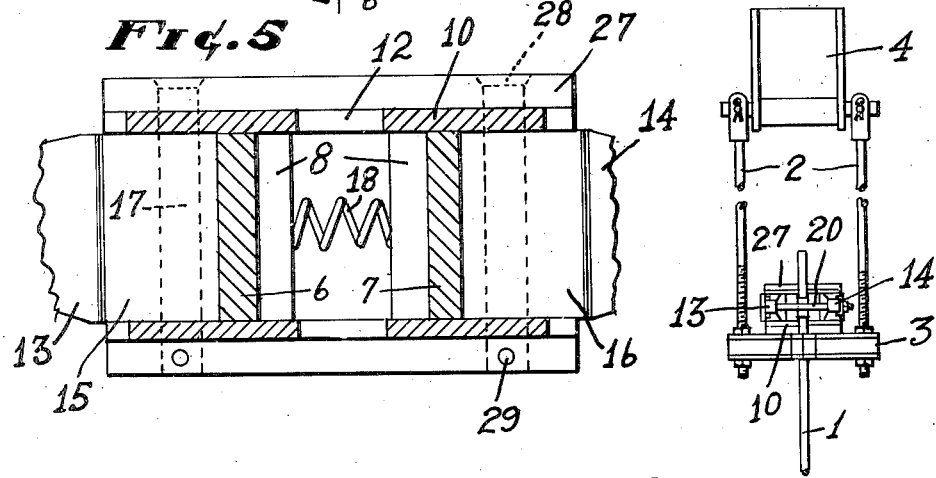
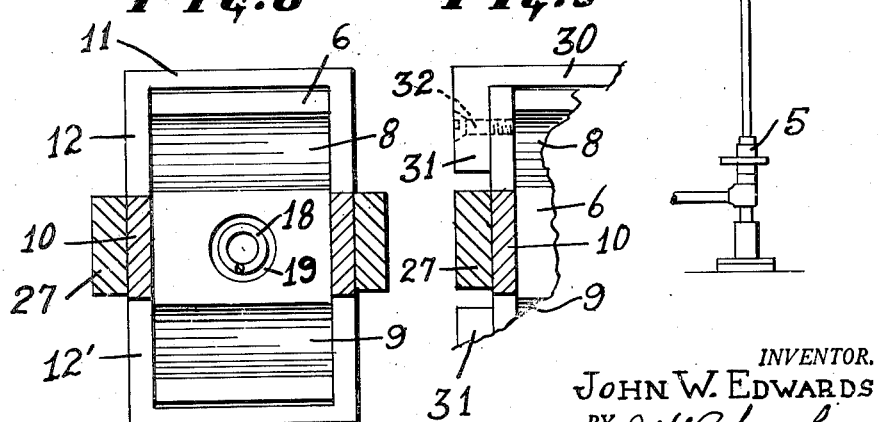
INVENTOR.
JOHN W. EDWARDS Patented Mar. 8, 1949

2,463,755

UNITED STATES PATENT OFFICE 2,463,755

POLISH ROD CLAMP

John W. Edwards, Wichita, Kans., assignor to Lota P. Edwards, Wichita, Kans.

Application September 16, 1946, Serial No. 697,357

4 Claims. (Cl. 24—81)

This invention herein disclosed relates to a polish rod clamp, and has for its principal object, the provision of a pair of clamping jaws arranged to work in substantially parallel relationship and adapted to efficiently grip rods varying in diameter, selectively.

Another object of this invention is to provide concavities or corresponding recesses in the confronting sides of the jaws adjacent one end thereof to fit closely about an unworn polish rod of a predetermined diameter, and another pair of corresponding concavities adjacent the other end of the jaws to coincide with the rod whose diameter varies from that of the first said rod, whereby should oil wells be equipped with either size, the concavities of the jaws corresponding thereto may be employed, as such rod and concavities must coincide to avoid mutilation of the rod as well as to assure a solid grip.

A still further object of this invention is to provide guiding means in the body of the clamp for each predetermined size of polish rod, or the like, as positioning means for the rod adjacent its respective concavities of the jaws prior to being gripped thereby.

A still further object is the provision of a spring to open the jaws when the cam levers to actuate the jaws are rocked to a disengaged position; and furthermore to construct the cam levers so that the same may be rocked in either direction from a disengaged position to substantially position a polish rod concentrically of the tool as a whole when installed.

A still further object is to construct the body of the clamp of a comparatively light plate-material so that one operator can conveniently carry and easily install the clamp, said body however being reinforced by bars at its outer sides to resist the pull of the cam levers when gripping a rod.

These and other objects will hereinafter be more fully explained, reference being had to the accompanying drawings forming a part of this specification, and in which like characters will apply to like parts in the different views.

Referring to the drawings:

Fig. 1 is a side elevation of the polish rod clamp, parts removed for convenience of illustration, and also showing the clamp gripping a polish rod.

Fig. 2 is an end view of Fig. 1, the polish rod being omitted.

Fig. 3 is an underside view of Fig. 1, parts removed for convenience of illustration.

Fig. 4 is a sectional view of the tool, illustrating the jaws in an open position, the connecting rod for the cam levers being removed.

Fig. 5 is a sectional view taken on line 5—5 in Fig. 4.

Fig. 6 is a sectional view taken on line 6—6 in Fig. 4.

Fig. 7 is a reduced view illustrating the adaptation of the polish rod clamp to a walking beam of an oil pumping device.

Fig. 8 is a modification showing the cross bars removably secured to the plates, the view otherwise being similar as that of Fig. 6 but fragmentarily shown.

It will be seen that the polish rod clamp as shown in Fig. 7 is gripped to an oil well polish rod 1, and positioned between a pair of rods 2 and on a hanger member 3 of a walking beam 4 of an oil well pumping device to lift the polish rod in its action of pumping, the polish rod extending loosely through the hanger member 3 to avoid a sudden thrust thereon by a downward rock of the walking beam. It will be understood that the polish rod moves downwardly by the weight of a great length of sucker rods which are connected to the polish rod, and as great strength is required to raise the polish rod in its pumping action, the clamping tool must be provided with sufficient gripping capacity to avoid longitudinal displacement of the polish rod therein.

While I have shown one application of the polish rod clamp, the same may be employed to retain the polish rod in an upward position in an oil well when the walking beam device is removed, in which case, the clamp may rest upon the stuffing box 5 of an oil well as shown in Fig. 7; and furthermore the clamping tool may be used in handling other types of rods or pipes from that set up in the specification.

Referring more particularly to the invention, it will be seen in Fig. 4 that a pair of clamping jaws 6 and 7 are arranged to move toward and from each other substantially in parallel relationship. The jaws are provided adjacent one end with corresponding concavities or recesses 8 in the confronting sides of the jaws to receive and coincide with a polish rod whose diameter is one inch and a quarter, and another pair of concavities 9 adjacent the other end of the jaws to receive and coincide with a polish rod whose diameter is one inch and an eighth, whereby provision is made to accommodate for two sizes of rods which are commonly employed in oil well operation. To assure a full gripping capacity of the jaws on the polish rod it is preferred that the concavities correspond exactly with the diameters of their respective polish rods to provide a solid contact peripherally of the rod, whereby mutilation or longitudinal displacement of the rod is eliminated when raising the same upwardly in the process of pumping.

The jaw members are positioned between a pair of plates 10 of the body structure that are secured in spaced relation by cross bars 11 extending from plate to plate and integrally joined thereto. By the arrangement of the bars 11, the jaws will be retained in substantially parallel relationship, but having sufficient clearance between the ends of the jaws and bars to permit a slight rock of the jaws from parallelism which will occur in gripping rods, it being understood that a portion equally in depth throughout the surface area of the confronting sides of the jaws is removed to form concavities less than a semi-circle, whereby the surfaces of a pair of concavities will be assured of full contact with its respective rod, however, in such case, the straight portions edjacent the other pair of concavities will contact simultaneously with the engagement of the first said concavities with its respective polish rod.

Positioned inwardly a spaced distance from the outer edges of the plates are a pair of notches or openings 12 and 12' terminating into a semi-circle, said openings being positioned adjacent and in working relation to their respective pair of concavities in the jaws to function as guides for rods prior to clamping the same by the jaws, the openings being greater in width than the diameter of the rod inserted therein.

Positioned on the opposite sides of the jaws is a pair of levers 13 and 14, the inner ends of said levers having integrally formed thereto their respective cams 15 and 16 engaging between the plates and being rockably carried by a bolt 17, later described. When the levers are rocked outward, or oppositely from each other as shown in Fig. 4, the jaws will move from each other to open the same for entry of a rod in either opening, said movement of the jaws being caused by a compression spring 18, the ends of which are seated in bores 19 formed a spaced distance inward in their respective jaws centrally thereof with respect to their confronting sides. To engage the jaws, the free end of the levers are rocked toward each other, causing the same to close the jaws. Should a rod whose diameter is one inch and an eighth be employed in an oil well, such rod will enter opening 12' to be engaged by its respective surfaces of the concavities 9 in the jaws. In such case, the levers are rocked toward the opening 12' and positioned as shown in Fig. 1 so that the polish rod may be substantially centrally disposed within the tool as a whole, thus avoiding excessive protrusions from the rod which would occur should the levers be rocked in the opposite direction from that shown in Fig. 1.

It will be seen in Fig. 1 that the jaws are forced tightly around the polish rod by a connecting rod 20, said connecting rod having a transverse rod 21 secured to one end of its ends to engage in arcuate notches 22 formed in oppositely disposed sides of the levers, said connecting rod extending through elongated slots 23 provided in the levers adjacent the notches. The other end of said connecting rod extends outward from its respective notch in the lever, said outwardly extending end of the connecting rod having a nut 25 threadedly engaging thereon to move the levers toward each other, which likewise will cause the jaws to tightly grip a polish rod positioned therebetween.

In operating the tool, one lever may be rocked prior to the other lever to its extreme inward movement to rest on shoulder 26 of bar 11, the shoulder being illustrated in Fig. 1, and then by rocking the other lever the connecting rod may be inserted to further bind the jaws of the polish rod, in which action, the first said lever may be moved away, but not necessarily so, from the shoulder 26 to position itself as shown in Fig. 1.

To reinforce the plates, there is positioned on the outer side of each plate a bar 27 secured thereto by the aforesaid bolt 17 engaging therethrough, said bolt having a conical head 28 on one end to engage in a corresponding conical recess formed in one bar, the bolt extending through the plates and jaws and into the other bar, at which point, a pin 29 transversely extends through the bar and bolt to rigidly secure the members carried by the bolt together, but permitting free rocking movement of the levers and their respective cams.

In Fig. 8 is shown a fragmentary view, to illustrate a modification of a cross bar 30 which may be removably secured to the plates by right angle bent portions 31 engaging over the sides of said plates and secured by screws 32, and furthermore the bars 27 may be integrally formed to the plates without departing from the spirit of this invention, and such other modifications may be employed as lie within the scope of the appended claims.

Having fully described my invention what I claim as new and desire to secure by Letters Patent is:

1. In a clamp of the class dscribed, a hollow body structure having oppositely disposed openings formed a spaced distance inward for entering work to be gripped by the clamp, a pair of jaws positioned within the body structure in working relation to the openings, said jaws having a pair of concavities confronting each other and being positioned adjacent each opening of the body structure, one pair of concavities varying in size over that of the other pair of concavities to accommodate for two different sized rods employed in oil well operation, means to move the jaws from each other, and lever means carried by the body structure to rock to the jaws toward each other for gripping work positioned in the openings selectively of the body structure.

2. In a clamp of the class described comprising a pair of plates spaced apart, a pair of jaws positioned between the plates to work substantially in parallel relationship, means to retain said jaws from outward movement of the plates, the confronting sides of the jaws having a plurality of different sized pairs of corresponding concavities formed therein to receive different sized rods, cam levers, the inner ends of which are rockably mounted between the plates to move the jaws inwardly toward each other, connecting means at the outer ends of the levers to actuate the cams, and spring means to open the jaws when the cams are rocked to a disengaged position.

3. In a clamp of the class described, a pair of plates, means to secure the plates in spaced relation, a pair of jaws carried between the plates and last said means and adapted to move to and from each other, a spring to open the jaws, said spring being seated in bores formed centrally in the confronting sides of the jaws, said jaws having a pair of corresponding concavities formed therein diametrically opposite the spring, one pair of corresponding concavities varying in size over that of the other pair to accommodate for two different diameters of rods to be clamped between the jaws, selectively, means positioned in the plates to guide the rods into the clamp and adjacent their respective concavities of the jaws, cam levers having their inner ends rockably secured to the plates to close the jaws tightly about a rod, and a connecting bolt engaging in the outer ends of the levers to rock the same inwardly, and reinforcing means secured to the outer sides of the plates to resist the force imposed on the plates by the gripping of a rod positioned in one pair of corresponding concavities.

4. In a clamp of the class described, a pair of plates, a plurality of cross bars to secure the plates in spaced relation and in parallelism, a pair of jaws coactingly positioned between the plates and retained from outward movement by the cross bars, the plates having openings to guide work to the jaws, a compression spring having its ends seated in bores formed in the confronting sides of the jaws concentrically thereof to open the same, a cam lever rockably carried between the plates for each jaw, said cam of the lever seating on the side of the jaw oppositely from that of the spring, said levers when rocked in straight alignment with each other permitting opening of the jaws and when rocked in either direction therefrom effecting closure of the jaws and a T-shaped connecting rod to draw the corresponding free ends of the levers toward each other for tightening of the jaws.

JOHN W. EDWARDS.

REFERENCES CITED

The following references are of record in the file of this patent:

UNITED STATES PATENTS

| Number | Name | Date |
| --- | --- | --- |
| 1,447,456 | Wright | Mar. 6, 1923 |
| 2,132,781 | Deckard | Oct. 11, 1938 |